UNITED STATES PATENT OFFICE.

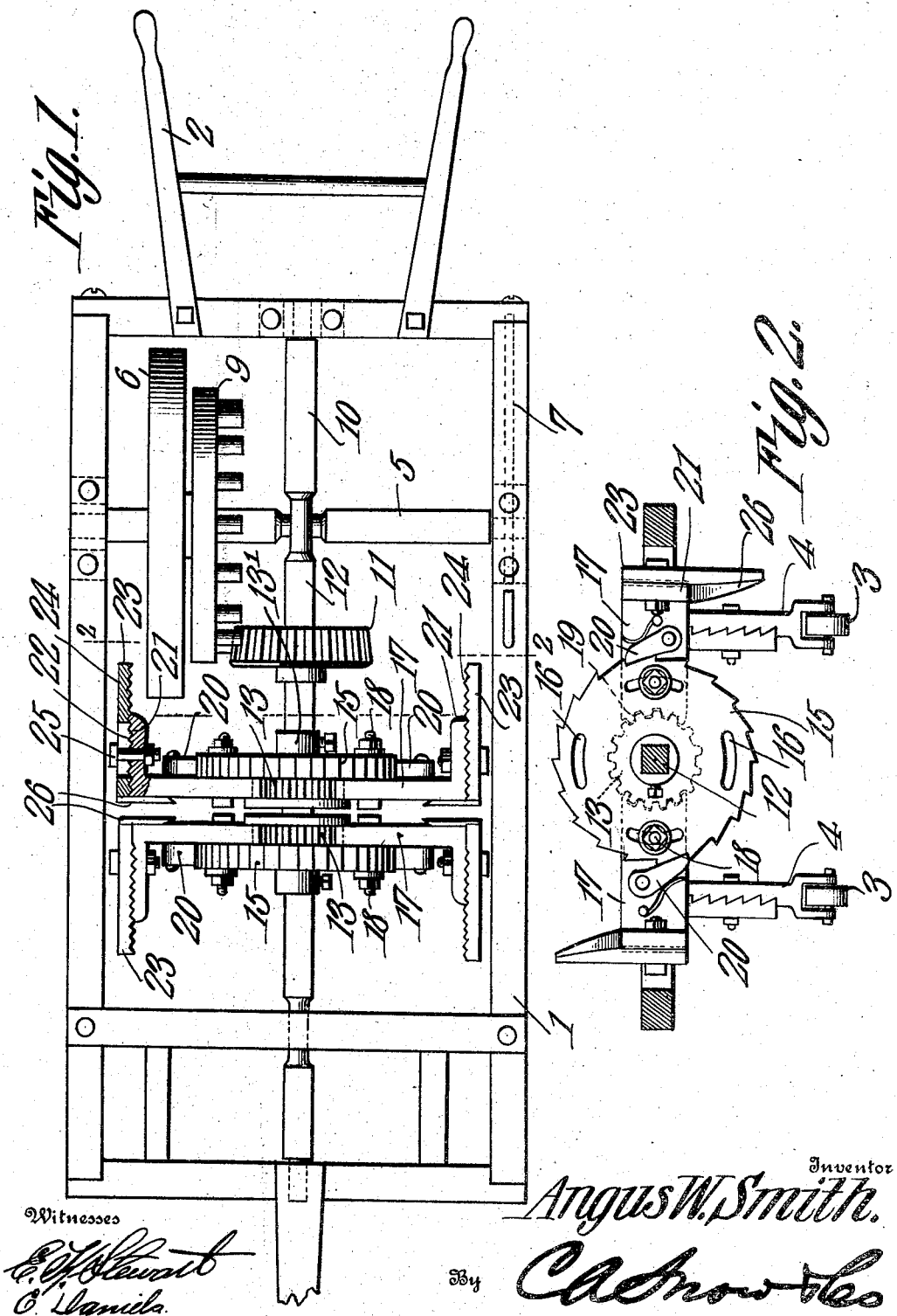

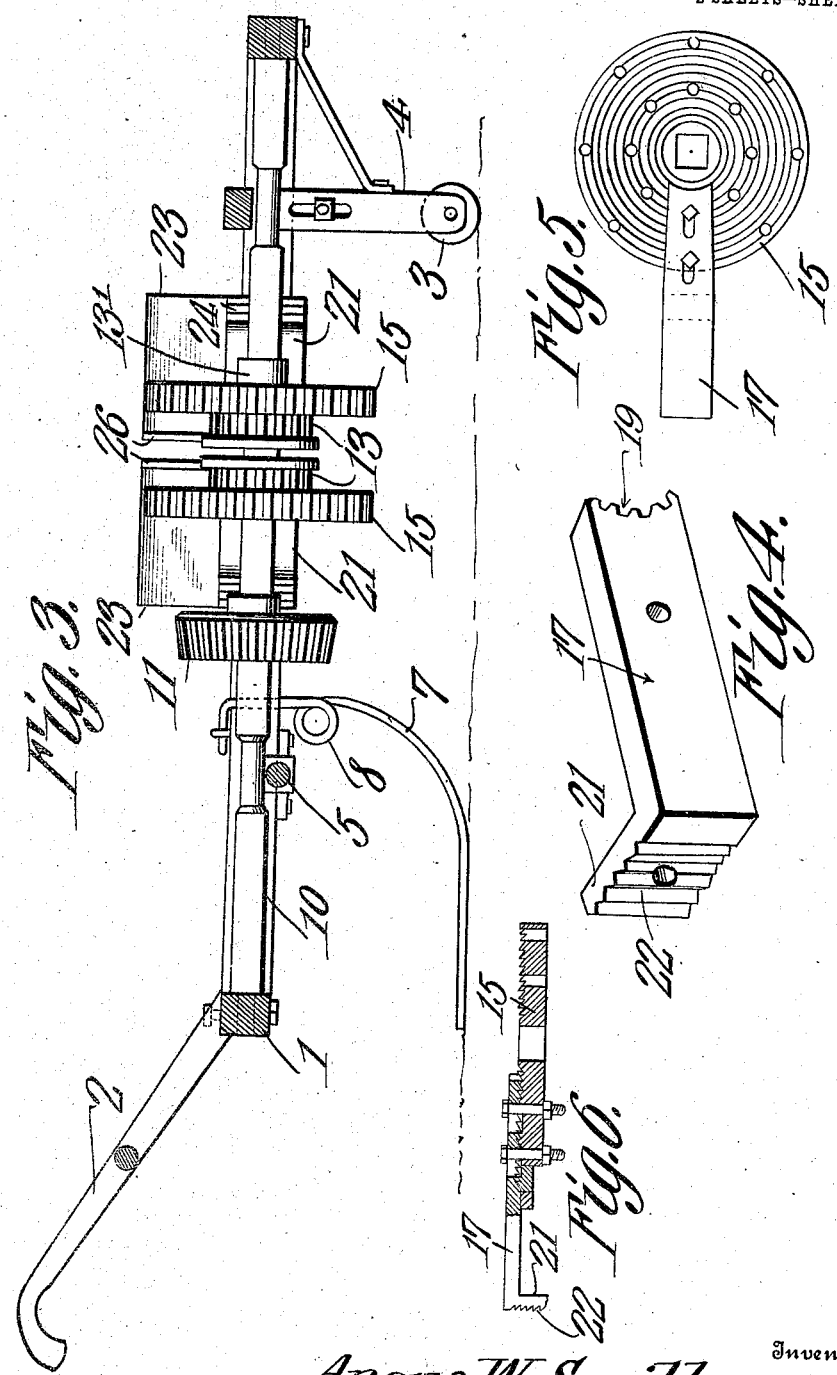

ANGUS WASHINGTON SMITH, OF UNION CHURCH, MISSISSIPPI.

COTTON-CHOPPER.

No. 894,911.   Specification of Letters Patent.   Patented Aug. 4, 1908

Application filed January 8, 1908. Serial No. 409,835.

*To all whom it may concern:*

Be it known that I, ANGUS WASHINGTON SMITH, a citizen of the United States, residing at Union Church, in the county of Jefferson and State of Mississippi, have invented a new and useful Cotton-Chopper, of which the following is a specification.

This invention has relation to cotton choppers and it consists in the novel construction and arrangement of its parts as hereinafter shown and described.

The object of the invention is to provide an implement of the character indicated which is provided with a series of blades mounted for rotation about an axis and which are adapted to be adjusted with relation to each other whereby the plants may be removed from a row at desired intervals and those which remain standing are left in such condition as to facilitate their growth and maturity.

Figure 1 is a top plan view of the cotton chopper. Fig. 2 is a transverse sectional view of the same cut on the line 2—2 of Fig. 1. Fig. 3 is a longitudinal sectional view of the chopper, Fig. 4 is a detail perspective view of a portion of a hoe arm used on the chopper. Fig. 5 is a face view of a modified form of hoe support used upon the chopper, and Fig. 6 is a sectional view of the same.

The chopper consists of the frame 1 which is provided at its rear end with the handles 2 and which is supported at its forward end upon the ground wheels 3 which in turn are journaled to the longitudinally extensible standards 4. By adjusting the standards 4 the forward end of the frame 1 may be raised or lowered as desired. The axle 5 is journaled for rotation near the rear end of the frame 1, and the traction wheel 6 is mounted upon said axle and is located at one side of the middle of the frame 1. The runner 7 is located at the opposite side of the frame 1 and is preferably made of heavy spring wire which is provided at an intermediate point with a convolution 8 which adds resiliency to the runner. The runner is attached at its forward end to the frame 1 at a point in advance of the axle 5 and extends at its rear portion beneath and in the rear of the said axle. The traction wheel 6 and the runner 7 are adapted to support the rear end of the frame 1 and are designed to lie or travel upon the opposite sides of the row of plants. The crown gear wheel 9 is mounted upon the axle 5 and rotates with the same. The shaft 10 is journaled for rotation in the frame 1 and is located substantially at the middle of the same. The gear wheel 11 is mounted upon the shaft 10 and meshes with the wheel 9. The intermediate portion of the shaft 10 is non-circular or squared as at 12 and upon this last said portion of the shaft 10 the cotton chopping elements are adjustably mounted. The ratchet disks 15 are also adjustably mounted upon the portion 12 of the shaft 10. The disks 15 are provided at suitable intervals and in the vicinity of their peripheries with the elongated perforations 16.

The arms 17 are adapted to be bolted to the sides of the disks 15 by means of the bolts 18 which pass transversely through the said arms and the perforations 16. The arms 17 are provided at their inner ends with gear teeth 19 which mesh with the gear wheels 13. The said arms are provided at intermediate points with pivoted pawls 20 which engage the peripheries of the disks 15. The arms 17 are provided with angularly disposed outer extremities 21, the outer surfaces of which are corrugated as at 22. The hoe blades 23 are provided with corrugated surfaces 24 which are adapted to engage the surfaces 22 and the bolts 25 serve as securing means for adjustably attaching the blades 23 to the parts 21 of the arms 17. The body portions of the blades 23 are horizontally disposed while each of the said blades is provided with a vertically disposed edge portion 26. By this arrangement it will be observed that two sets of chopping hoes are provided upon the shaft 10, one set being located in advance of the other and means is provided for increasing or decreasing the distance or space between the two sets of hoe blades. By such an arrangement a large or small number of plants may be left standing in the row. It will also be observed that any desired number of arms 17 may be attached to the disks 15, whereby the space between the plants left standing in the row may be increased or diminished; also by reason of the elongated perforations 16 in the disks 15 the arms 17 may be arranged close together or far apart.

As the implement is drawn along the row of plants the traction wheel 6 rotates the axle 5 which in turn carries around the wheel 9. As said wheel 9 is in mesh with the wheel 11 the latter together with the shaft 10 is rotated. As the said shaft rotates the disks and gear wheels mounted thereon are correspondingly rotated and arms 17 rotate about an axis. Thus the blades 23 are caused to engage the row of plants in a transverse direction and cut out the superfluous plants. By adjustably mounting the blades 23 upon the extremities 21 of the arms 17 the said blades may be so positioned with relation to each other as to leave the remaining plants spaced apart from each other at regular and accurate intervals.

Having described my invention, what I claim as new and desire to secure by Letters-Patent is:

1. A cotton chopper comprising a frame, a shaft journaled for rotation thereon, means for rotating the shaft, gear wheels mounted upon the shaft, ratchet disks mounted upon the shaft and having elongated perforations, arms attached to the disks by means of bolts which pass through said perforations, said arms having teeth which engage said gear wheels and hoe blades adjustably attached to the arms.

2. In a cotton chopper a shaft journaled for rotation, gear wheels adjustably mounted upon said shaft, ratchet disks adjustably mounted upon the shaft, arms bolted to the disks and having teeth which engage the gear wheels, and hoe blades adjustably mounted upon said arms.

In testimony that I claim the foregoing as my own, I have hereto affixed my signature in the presence of two witnesses.

ANGUS WASHINGTON SMITH.

Witnesses:
CHARLIE SMITH,
W. M. SMITH.